(12) United States Patent
Sadabadi (10) Patent No.: US 10,451,117 B2
(45) Date of Patent: Oct. 22, 2019

(54) CONNECTION FOR TRANSMITTING TORQUE AND AXIAL FORCES

(71) Applicant: Halliburton Energy Services, Inc., Houston, TX (US)

(72) Inventor: Hamid Sadabadi, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 240 days.

(21) Appl. No.: 15/533,948

(22) PCT Filed: Jan. 12, 2015

(86) PCT No.: PCT/CA2015/000015
§ 371 (c)(1),
(2) Date: Jun. 7, 2017

(87) PCT Pub. No.: WO2016/112451
PCT Pub. Date: Jul. 21, 2016

(65) Prior Publication Data
US 2017/0328414 A1    Nov. 16, 2017

(51) Int. Cl.
*F16D 1/116*    (2006.01)
*F16B 7/18*    (2006.01)
(Continued)

(52) U.S. Cl.
CPC ............. *F16D 1/116* (2013.01); *E21B 17/03* (2013.01); *E21B 17/042* (2013.01); *F16B 7/182* (2013.01);
(Continued)

(58) Field of Classification Search
CPC .......... F16D 1/116; F16D 1/108; F16D 1/076; F16D 1/104; F16D 1/033; F16D 2001/102; F16B 7/182; E21B 17/042; E21B 17/03; Y10T 403/58; Y10T 403/7067; Y10T 403/7098
USPC ............... 464/182; 403/315, 338, 374.3, 383
See application file for complete search history.

(56) References Cited

U.S. PATENT DOCUMENTS 1,660,792 A * 2/1928 Hirth ................. F16D 1/033
464/182
2,850,264 A 9/1958 Grable
(Continued)

FOREIGN PATENT DOCUMENTS

GB    13329    * 5/1897 ................... 403/338

OTHER PUBLICATIONS

"Why General Polygon", General Polygon Systems, Inc., www.generalpolygon.com/why.htm, 2011-2012 (2 pages).

*Primary Examiner* — Greg Binda
(74) *Attorney, Agent, or Firm* — Terrence N. Kuharchuk; Parlee McLaws LLP; Craig W. Roddy (57) ABSTRACT

A connection for connecting a first member with a second member. The connection includes a torque transmitting connection between the first member and the second member and an axial force transmitting connection between the first member and the second member. The axial force transmitting connection includes a first exterior shoulder on the first member, a second exterior shoulder on the second member, a first collar having a first interior shoulder for engaging with the first exterior shoulder, a second collar having a second interior shoulder for engaging with the second exterior shoulder, and a collar connection between the first collar and the second collar for transmitting an axial force between the first collar and the second collar.

20 Claims, 5 Drawing Sheets

(51) Int. Cl.
  *E21B 17/03*    (2006.01)
  *F16D 1/108*    (2006.01)
  *E21B 17/042*   (2006.01)
  *F16C 1/02*     (2006.01)
  *F16D 1/033*    (2006.01)
  *F16D 1/076*    (2006.01)
  *F16D 1/104*    (2006.01)
  *F16D 1/10*     (2006.01)

(52) U.S. Cl.
  CPC ............... *F16C 1/02* (2013.01); *F16D 1/108* (2013.01); *F16D 1/033* (2013.01); *F16D 1/076* (2013.01); *F16D 1/104* (2013.01); *F16D 2001/102* (2013.01); *Y10T 403/58* (2015.01); *Y10T 403/7067* (2015.01); *Y10T 403/7098* (2015.01)

(56) References Cited

U.S. PATENT DOCUMENTS

| | | |
|---|---|---|
| 3,359,013 A | 12/1967 | Knox et al. |
| 4,753,460 A | 6/1988 | Tung |
| 5,135,059 A | 8/1992 | Turner et al. |
| 5,415,442 A | 5/1995 | Klementich |
| 5,681,059 A | 10/1997 | Mackie |
| 6,047,997 A | 4/2000 | Olivier |
| 6,116,658 A | 9/2000 | Bohlen |
| 6,305,723 B1 | 10/2001 | Schutz et al. |
| 6,461,111 B1 | 10/2002 | Haugen et al. |
| 6,581,980 B1 | 6/2003 | DeLange et al. |
| 6,616,412 B2 | 9/2003 | Haugen et al. |
| 6,767,035 B2 | 7/2004 | Hashem |
| 6,789,822 B1 | 9/2004 | Metcalfe |
| 7,255,374 B2 | 8/2007 | Carcagno et al. |
| 7,347,459 B2 | 3/2008 | Geary et al. |
| 7,607,333 B2 | 10/2009 | Sivley, IV et al. |
| 7,900,720 B2 | 3/2011 | Hall et al. |
| 8,052,176 B2 | 11/2011 | Shears et al. |
| 8,075,218 B2 * | 12/2011 | Kroener .................. F16D 1/092 403/383 X |
| 8,464,788 B2 | 6/2013 | Stanford |
| 2010/0119301 A1 | 5/2010 | Langer et al. |
| 2012/0157217 A1 | 6/2012 | Nakamura et al. |
| 2013/0039696 A1 | 2/2013 | Mori et al. |
| 2014/0084582 A1 | 3/2014 | Elder et al. |
| 2014/0224545 A1 | 8/2014 | Nicol-Seto |

\* cited by examiner

CONNECTION FOR TRANSMITTING TORQUE AND AXIAL FORCES

TECHNICAL FIELD

A connection for connecting and for transmitting torque and axial forces between two members such as shafts.

BACKGROUND OF THE INVENTION

It is often necessary to connect together two members, and it may be desirable to provide a connection between two members which is capable of transmitting torque and axial forces between the two connected members.

BRIEF DESCRIPTION OF DRAWINGS

Embodiments of the invention will now be described with reference to the accompanying drawings, in which.

DETAILED DESCRIPTION

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present disclosure is directed at a connection for connecting two members. In some embodiments, the members may be elongate members, including as non-limiting examples, columns, beams, or shafts. In some embodiments, the members may be stationary structural members. In some embodiments, the members may be movable members, including as non-limiting examples, rotatable shafts.

The connection may be used in any structure, device or apparatus in which it is necessary or desirable to connect two members.

In some embodiments, the connection may be used in an apparatus which is configured to be contained within a borehole. In some embodiments, the connection may be used in an apparatus for use in drilling a borehole. In some embodiments, the connection may be used to connect components of a powertrain.

In some embodiments, the apparatus may be a drilling motor. In some embodiments, the connection may be used to connect components of a powertrain of the drilling motor. In some embodiments, one of the first member and the second member may be a transmission shaft in the drilling motor. In some embodiments, the transmission shaft may comprise one or more shafts and constant velocity couplings. In some embodiments, the transmission shaft may comprise a flex shaft.

The connection transmits both torque and axial forces between a first member and a second member. The connection therefore provides a torque transmitting connection between the first member and the second member and an axial force transmitting connection between the first member and the second member.

The torque transmitting connection between the first member and the second member may comprise any structure, device or apparatus which is capable of transmitting torque between the members. The torque transmitting connection may be separate from the axial force transmitting connection so that the torque transmitting connection is not required to transmit axial forces between the first member and the second member.

In some embodiments, the first member and the second member may have complementary torque transmitting surfaces and the torque transmitting connection may comprise the complementary torque transmitting surfaces.

The complementary torque transmitting surfaces may comprise, consist of or consist essentially of any suitable shapes of the first member and the second member and/or surfaces on the first member and the second member which will prevent or inhibit relative rotation between the first member and the second member. As non-limiting examples, the complementary torque transmitting surfaces may comprise non-circular shapes, splines, keys/keyways, projections/slots, lugs/grooves and similar structures.

The complementary torque transmitting surfaces may be provided at any suitable location on the first member and the second member. In some embodiments, the first member may have a first member connection end, the second member may have a second member connection end, and the complementary torque transmitting surfaces may be provided at or adjacent to the first member connection end and the second member connection end. In some embodiments, the complementary torque transmitting surfaces may be provided at, on or within structures associated with the first member connection end and the second member connection end.

In some particular embodiments, one of the first member connection end and the second member end may comprise a pin, the other of the first member connection end and the second member connection end may comprise a socket, and the pin may be receivable within the socket. In some such embodiments, the complementary torque transmitting surfaces may be provided on the pin and in the socket. In some particular embodiments, the pin may have a polygonal exterior surface, the socket may have a polygonal interior surface, and the complementary torque transmitting surfaces may comprise the polygonal exterior surface on the pin and the polygonal interior surface on the socket.

The axial force transmitting connection is capable of transmitting axial forces between the first member and the second member in at least one direction in order to maintain the members in a connected state. As a result, the axial force transmitting connection prevents or inhibits the first member from becoming separated from the second member. In some embodiments, the axial force transmitting connection may be capable of transmitting axial forces between the first member and the second member in both a direction tending to separate the members (i.e., a tensile force direction) and a direction tending to urge the members together (i.e. a compressive force direction).

The axial force transmitting connection between the first member and the second member may be provided by the members in cooperation with one or more structures, devices or apparatus which are separate from the members. In some embodiments, the members may be adapted to cooperate with such structures, devices or apparatus in order to provide the axial force transmitting connection.

The members and the structures, devices or apparatus may cooperate in any suitable manner in order to provide the axial force transmitting connection.

In some embodiments, the structures, devices or apparatus may comprise one or more collars which cooperate with the members in order to provide the axial force transmitting connection.

In some embodiments, a collar may comprise a unitary structure which surrounds a member. In some embodiments, a collar may comprise a plurality of collar sections which may be connected together in a suitable manner to provide a collar which surrounds a member. A collar comprising a plurality of collar sections may be desirable for facilitating assembly of the connection in some circumstances.

In some embodiments, a first collar may engage with the first member in order to transmit axial forces between the first member and the first collar in at least one direction, a second collar may engage with the second member in order to transmit axial forces between the second member and the second collar in at least one direction, and a collar connection may be provided to transmit axial forces between the first collar and the second collar in at least one direction.

In some embodiments, the first member may comprise one or more surfaces, the second member may comprise one or more surfaces, and the surfaces on the members may engage with surfaces on one or more collars in order to provide the axial force transmitting connection.

In some particular embodiments, the surfaces on the members may comprise a first exterior shoulder on an exterior surface of the first member and a second exterior shoulder on an exterior surface of the second member.

In some embodiments, the first exterior shoulder may be substantially transverse to an axis of the first member in order to enable the first exterior shoulder to transmit axial forces, and the first exterior shoulder may face away from the first member connection end in order to prevent or inhibit the first member from moving away from the second member.

In some embodiments, the first exterior shoulder may be substantially continuous around the circumference of the exterior surface of the first member. In some embodiments, the first exterior shoulder may be discontinuous around the circumference of the exterior surface of the first member. In some embodiments, the first exterior shoulder may be extend around only a portion of the circumference of the exterior surface of the first member, and/or may extend intermittently around the circumference of the exterior surface of the first member.

In some embodiments, the second exterior shoulder may be substantially transverse to an axis of the second member in order to enable the second exterior shoulder to transmit axial forces, and the second exterior shoulder may face away from the second member connection end in order to prevent or inhibit the second member from moving away from the first member.

In some embodiments, the second exterior shoulder may be substantially continuous around the circumference of the exterior surface of the second member. In some embodiments, the second exterior shoulder may be discontinuous around the circumference of the exterior surface of the second member. In some embodiments, the second exterior shoulder may be extend around only a portion of the circumference of the exterior surface of the second member, and/or may extend intermittently around the circumference of the exterior surface of the second member.

In some such embodiments, the surfaces on the one or more collars may comprise shoulders which engage with the first exterior shoulder and the second exterior shoulder.

In some particular embodiments, a first collar may have an interior surface and a first interior shoulder on the interior surface for engaging with the first exterior shoulder on the first member.

In some embodiments, the first interior shoulder may be substantially continuous around the circumference of the interior surface of the first collar. In some embodiments, the first interior shoulder may be discontinuous around the circumference of the interior surface of the first collar. In some embodiments, the first interior shoulder may be extend around only a portion of the circumference of the interior surface of the first collar, and/or may extend intermittently around the circumference of the interior surface of the first collar.

In some particular embodiments, a second collar may have an interior surface and a second interior shoulder on the interior surface for engaging with the second exterior shoulder on the second member.

In some embodiments, the second interior shoulder may be substantially continuous around the circumference of the interior surface of the second collar. In some embodiments, the second interior shoulder may be discontinuous around the circumference of the interior surface of the second collar. In some embodiments, the second interior shoulder may be extend around only a portion of the circumference of the interior surface of the second collar, and/or may extend intermittently around the circumference of the interior surface of the second collar.

In embodiments comprising a first collar and a second collar, a collar connection may be provided between the first collar and the second collar in order to transmit axial forces between the first collar and the second collar in at least one direction in order to prevent or inhibit separation of the collars and the members.

The collar connection between collars may comprise any connection which is capable of transmitting axial forces between the collars in at least one direction. In some embodiments, the collar connection may be capable of transmitting axial forces in both a direction tending to separate the members (i.e., a tensile force direction) and a direction tending to urge the members together (i.e. a compressive force direction).

In some embodiments, the collar connection may be a permanent connection which cannot be broken without significantly damaging one or both of the collars. As non-limiting examples, a permanent collar connection may comprise a welded connection, a crimped connection, or in some circumstances an adhesive connection between the collars.

In some embodiments, the collar connection may be a releasable connection which can be broken without significantly damaging either of the collars. As non-limiting examples, a releasable collar connection may comprise a threaded connection, a bolted connection, a riveted connection, a collet connection, an interference fit connection, a latched connection, or in some circumstances an adhesive connection between the collars.

FIGS. 1-8 depict non-limiting embodiments of an application of the connection in a drilling motor for use in drilling a borehole, wherein the connection is used to connect powertrain components of the drilling motor.

Figure 1:
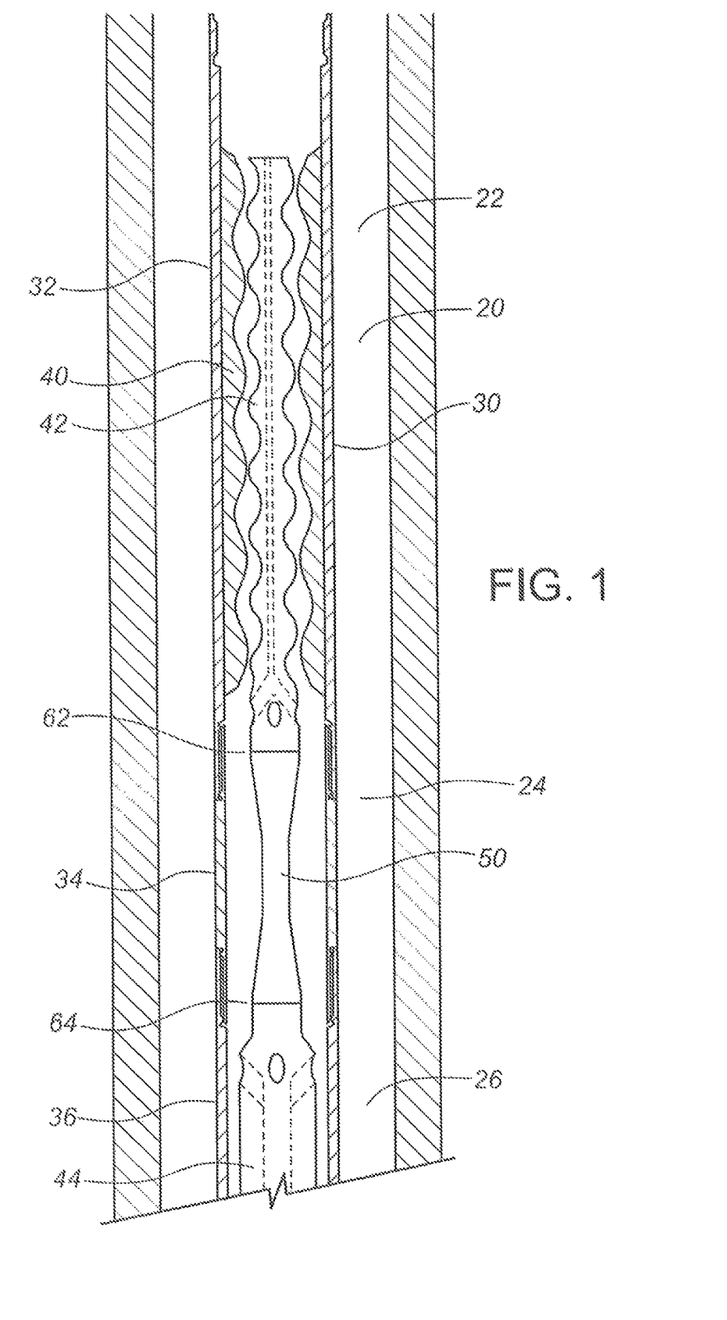
FIG. 1 is a schematic longitudinal partial section view of components of an exemplary drilling motor for use in drilling a borehole, including a transmission section of the drilling motor, shown within a borehole.
Figure 2:
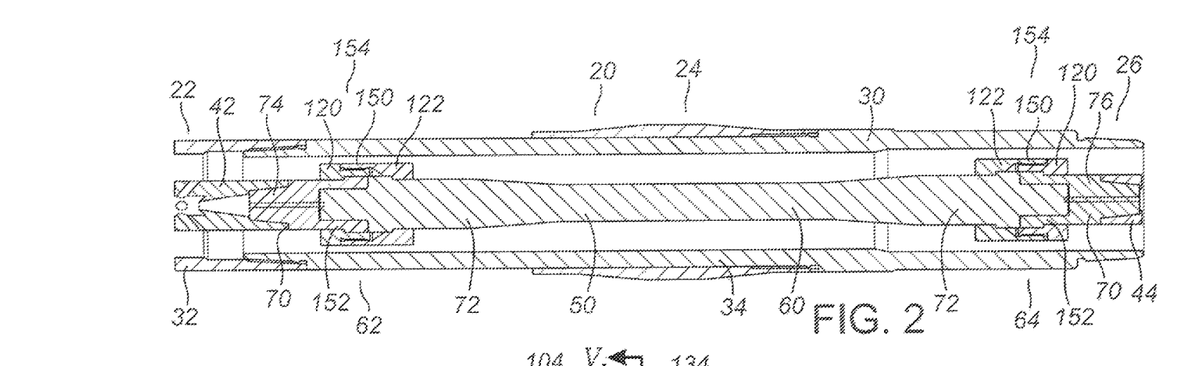
FIG. 2 is a cutaway view of a transmission section of an exemplary drilling motor for use in drilling a borehole, including a flex shaft connected between a rotor and a driveshaft.
Figure 3:
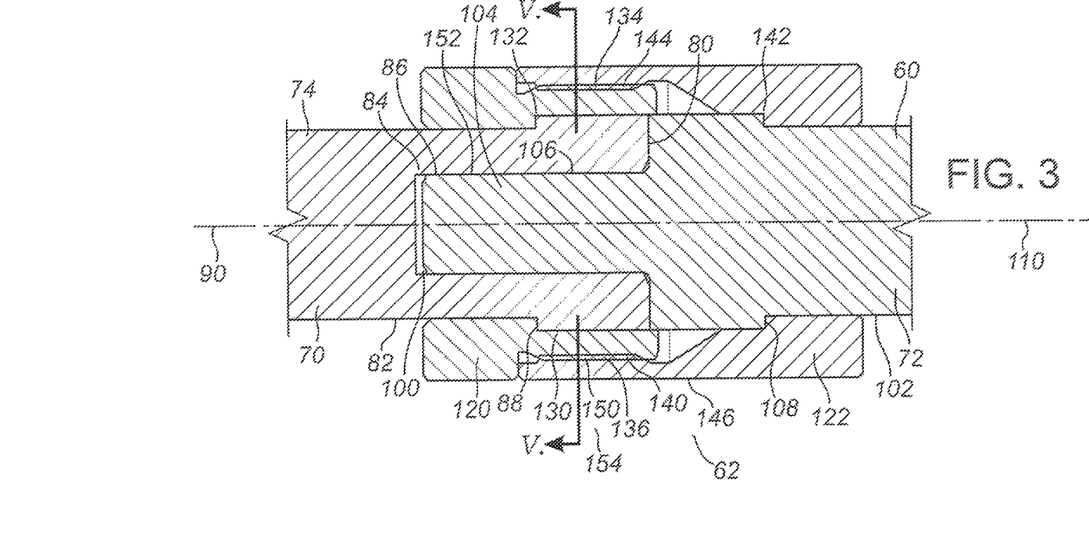
FIG. 3 is a longitudinal section assembly view of an embodiment of a connection between the rotor and the flex shaft in the transmission section of the drilling motor depicted in FIG. 2.
Figure 4:
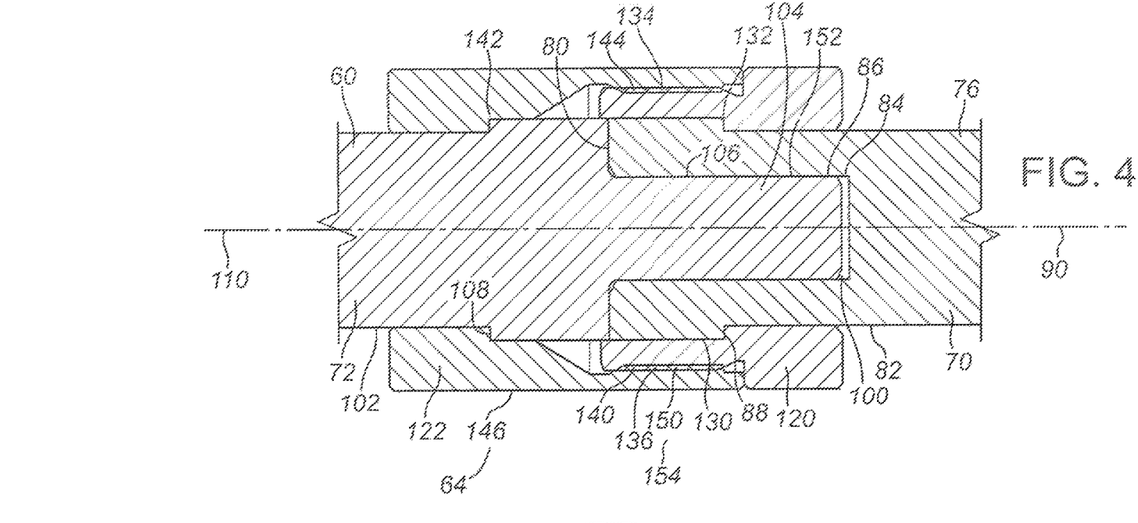
FIG. 4 is a longitudinal section assembly view of an embodiment of a connection between the flex shaft and the driveshaft in the transmission section of the drilling motor depicted in FIG. 2.
Figure 5:
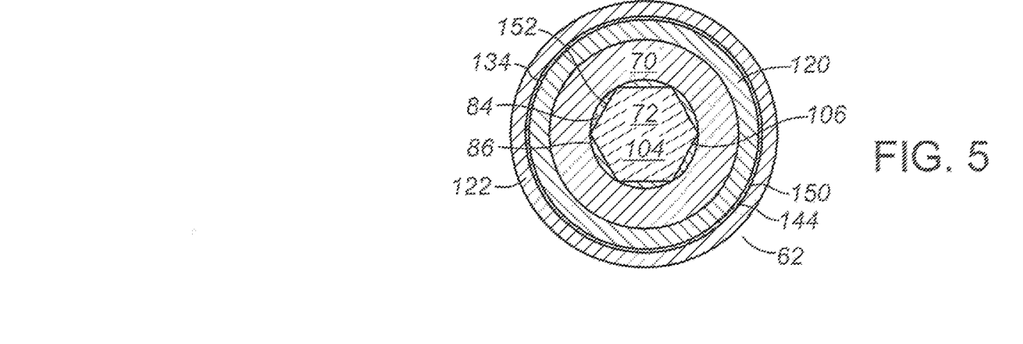
FIG. 5 is a transverse section view of the connection depicted in FIG. 3, taken along line 5-5 in FIG. 3.
Figure 6:
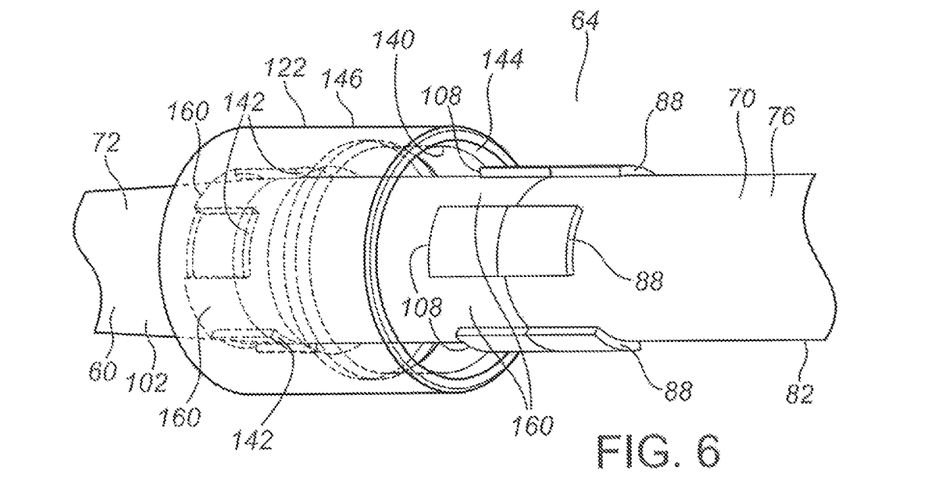
FIG. 6 is a partial cutaway pictorial view of a second member and a second collar in an embodiment of a connection which may facilitate assembly of the connection in some circumstances.
Figure 7:
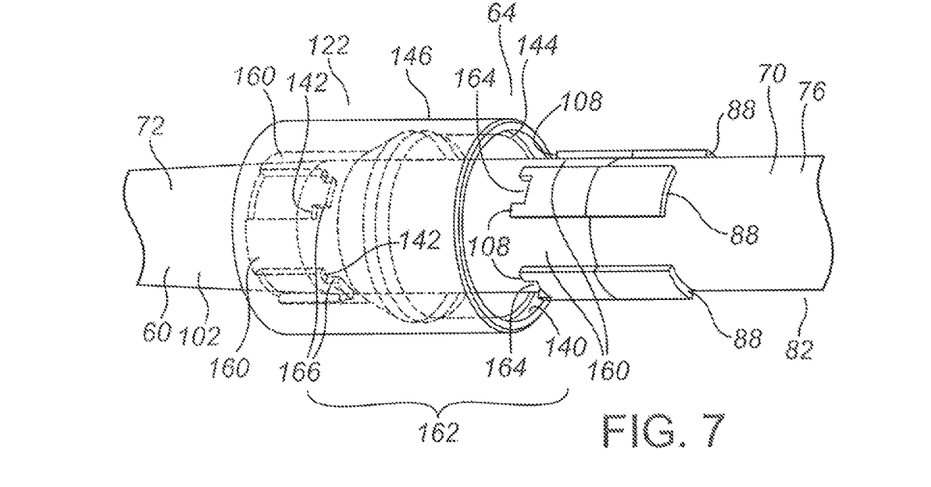
FIG. 7 is a partial cutaway pictorial view of a second member and a second collar in a modified embodiment of the connection depicted in FIG. 6.
Figure 8:
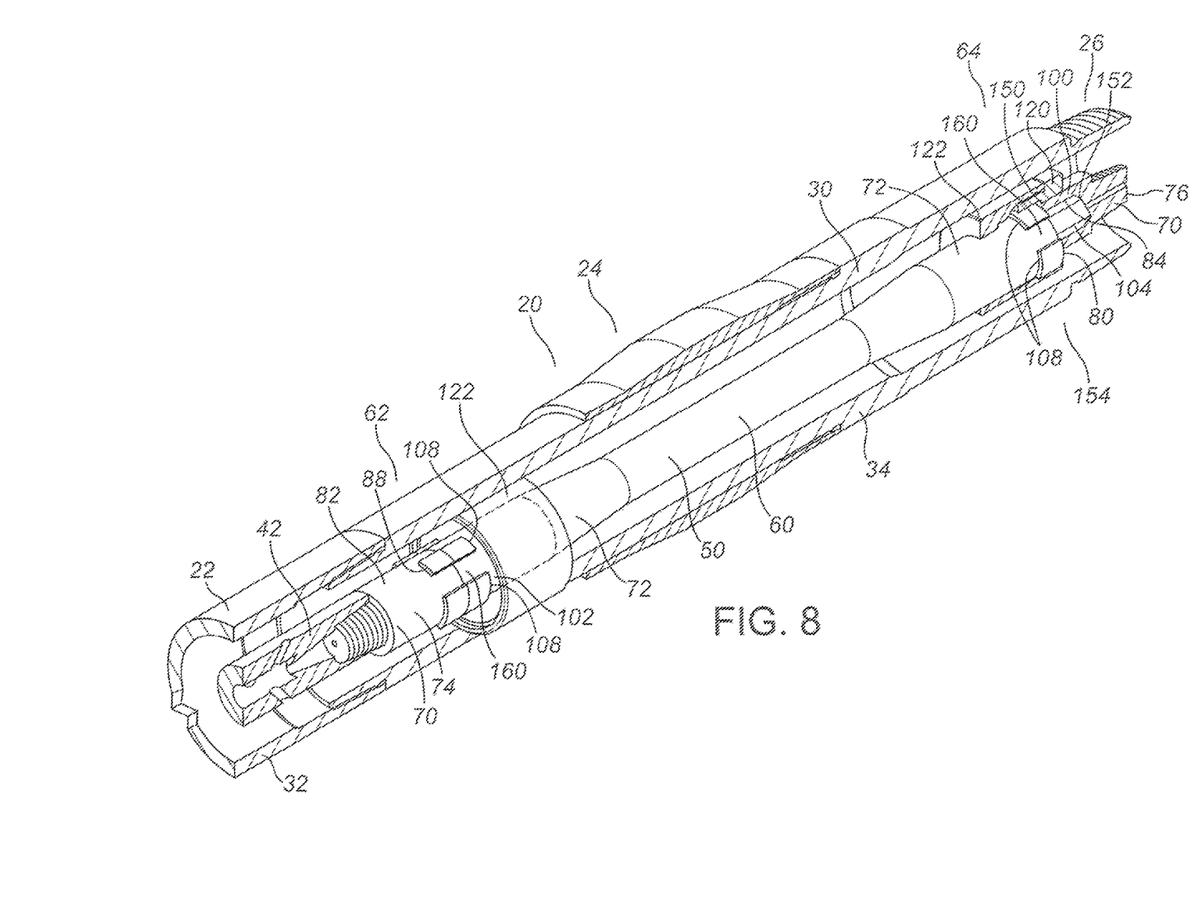
FIG. 8 is a cutaway view of the transmission section depicted in FIG. 2, including the embodiment of the connection depicted in FIG. 6.

More particularly, FIG. 1 schematically depicts components of an exemplary drilling motor for use in drilling a borehole, including a power section, a transmission section and a bearing section. FIG. 2 depicts a transmission section comprising a flex shaft in an exemplary drilling motor, including connections at both ends of the flex shaft. FIGS. 3-5 depict details of the connections at the ends of the flex shaft shown in FIG. 2. FIGS. 6-8 depict details of an embodiment of a connection which facilitates assembly of the connection in some circumstances.

FIGS. 1-8 are exemplary only. The connection described herein may be used to connect two members in any suitable structure, device or apparatus, and may be used at any suitable location in any suitable structure, device or apparatus to connect two members.

In the description which follows, features which are identical or equivalent in FIGS. 1-8 are identified with the same reference numbers.

Referring to FIG. 1, an exemplary drilling motor (20) comprises a plurality of sections, only some of which are depicted in FIG. 1. Depicted in FIG. 1 are a power section (22), a transmission section (24) and a bearing section (26). The sections of the drilling motor (22) constitute components of a powertrain which utilizes fluid energy to rotate a drill bit (not shown) connected with the drilling motor (22).

The sections of the drilling motor (20) are contained within a housing (30). The housing (30) may comprise a single piece tubular housing, or may comprise a plurality of housing sections connected together in a suitable manner.

As depicted in FIG. 1, the housing (30) comprises a plurality of housing sections connected together with threaded connections, including a power section housing (32), a transmission section housing (34), and a bearing section housing (36).

The power section (22) of the drilling motor (20) comprises a stator (40) and a rotor (42). The stator (40) is fixedly connected with the power section housing (32), and the rotor (42) is rotatable within the stator (40) in response to fluid circulating through the power section (22).

As depicted in FIG. 1, the power section (22) is a Moineau-type power section in which the stator (40) and the rotor (42) are lobed. The rotor (42) has one fewer lobe than the stator (40), and rotates within the stator (40) eccentrically relative to the axis of the drilling motor (20).

The transmission section (24) accommodates and converts the eccentric movement of the rotor (42) to concentric rotation of a driveshaft (44) within the bearing section housing (34). A drill bit (not shown) is connected directly or indirectly with the driveshaft (44) so that rotation of the rotor (42) causes rotation of the drill bit.

As depicted in FIG. 1, the transmission section (24) comprises a transmission shaft (50) which is connected between the rotor (42) and the driveshaft (44) so that rotation of the rotor (42) causes rotation of the transmission shaft (50), and rotation of the transmission shaft (50) causes rotation of the driveshaft (44). The transmission shaft (50) may be directly or indirectly connected with the rotor (42) and the driveshaft (44).

The transmission shaft (50) may comprise any structure, device or apparatus which is capable of accommodating the eccentric rotation of the rotor (42) and converting the eccentric rotation of the rotor (42) to concentric rotation of the driveshaft (44). As non-limiting examples, the transmission shaft (50) may comprise one or more shafts and constant velocity couplings, or the transmission shaft (50) may comprise a flex shaft.

Referring to FIG. 2, exemplary embodiments of connections for use in an exemplary transmission section (24) of a drilling motor (20) are depicted. As depicted in FIG. 2, the transmission shaft (50) is comprised of a flex shaft (60) which is connected between the rotor (42) and the driveshaft (46) with a first connection (62) between the rotor (42) and the flex shaft (60), and a second connection (64) between the flex shaft (60) and the driveshaft (44). The first connection (62) and the second connection (64) depicted in FIG. 2 are substantially identical and thus constitute similar non-limiting embodiments of the connection described herein.

The first connection (62) is depicted in detail in FIG. 3 and FIG. 5. The second connection (64) is depicted in detail in FIG. 4.

Referring to FIGS. 2-3 and FIG. 5, the first connection (62) is provided between a first member (70) and a second member (72).

The first member (70) in the first connection (62) is the rotor (42). As depicted in FIG. 2, the rotor (42) comprises a rotor adapter (74) which provides certain features of the first connection (62). In other embodiments, the rotor (42) may provide the features of the first connection (62) without the need for the rotor adapter (74).

The second member (72) in the first connection (62) is the flex shaft (60). As depicted in FIG. 2, the flex shaft (60) provides features of the first connection (62) without the need for a flex shaft adapter (not shown). In other embodiments, the flex shaft (60) may comprise a flex shaft adapter which may provide certain features of the first connection (62).

Referring to FIG. 4, the second connection (64) is also provided between a first member (70) and a second member (72).

The first member (70) in the second connection (64) is the driveshaft (44). As depicted in FIG. 2, the driveshaft (44) comprises a driveshaft adapter (76) which provides certain features of the second connection (64). In other embodiments, the driveshaft (44) may provide the features of the second connection (64) without the need for the driveshaft adapter (76).

The second member (72) in the second connection (64) is the flex shaft (60). As depicted in FIG. 2, the flex shaft (60) provides features of the second connection (64) without the need for a flex shaft adapter (not shown). In other embodiments, the flex shaft (60) may comprise a flex shaft adapter which may provide certain features of the second connection (64).

Referring to FIGS. 3-5, the first member (70) has a first member connection end (80) and an exterior surface (82). The first member connection end (80) comprises a socket (84). As depicted in FIG. 5, the socket (84) has a polygonal interior surface (86) in the shape of a hexagon. In other embodiments, the interior surface of the socket (84) may as non-limiting examples have a different polygonal shape, may have a shape other than a polygon, and/or may comprise splines.

The exterior surface (82) of the first member (70) has a first exterior shoulder (88) which extends continuously around the circumference of the exterior surface (82). In other embodiments, the first exterior shoulder (88) may be discontinuous, may extend around only a portion of the circumference of the exterior surface (82), and/or may extend intermittently around the circumference of the exterior surface (82).

The first exterior shoulder (88) is substantially transverse to an axis (90) of the first member (70) and faces away from the first member connection end (80). As a result, axial forces exerted on the first exterior shoulder (88) are exerted in the direction of the first member connection end (80).

The second member (72) has a second member connection end (100) and an exterior surface (102). The second member connection end (100) comprises a pin (104). Referring to FIG. 5, the pin (104) has a polygonal exterior surface (106) in the shape of a hexagon which is complementary to the shape of the interior surface of the socket (84) in the first member (70). In other embodiments, the exterior surface of the pin (104) may have a different polygonal shape or may have a shape other than a polygon.

The exterior surface (102) of the second member (72) has a second exterior shoulder (108) which extends continuously around the circumference of the second member (72). In other embodiments, the second exterior shoulder (108) may be discontinuous, may extend around only a portion of the circumference of the exterior surface (102), and/or may extend intermittently around the circumference of the exterior surface (102).

The second exterior shoulder (108) is substantially transverse to an axis (110) of the second member (72) and faces away from the second member connection end (100). As a result, axial forces exerted on the second exterior shoulder (108) are exerted in the direction of the second member connection end (80).

Referring again to FIGS. 3-5, a first collar (120) is associated with the first member (70) and a second collar (122) is associated with the second member (72).

The first collar (120) has an interior surface (130). As depicted in FIGS. 3-5, the first collar (120) is slidably received on the first member (70) so that the interior surface (130) of the first collar (120) surrounds the exterior surface (82) of the first member (70).

The interior surface (130) of the first collar (120) has a first interior shoulder (132) which extends continuously around the circumference of the interior surface (130). In other embodiments, the first interior shoulder (132) may be discontinuous, may extend around only a portion of the circumference of the interior surface (130), and/or may extend intermittently around the circumference of the interior surface (130). The first interior shoulder (132) faces toward and is configured to engage with the first exterior shoulder (88) on the first member (70).

As depicted in FIGS. 3-5, the first collar (120) comprises a thread (134) on an exterior surface (136) of the first collar (120). In other embodiments, the first collar (120) may comprise a thread (134) on the interior surface (130) of the first collar (120).

The second collar (122) has an interior surface (140). As depicted in FIGS. 3-5, the second collar (122) is slidably received on the second member (72) so that the interior surface (140) of the second collar (120) surrounds the exterior surface (102) of the second member (72).

The interior surface (140) of the second collar (122) has a second interior shoulder (142) which extends continuously around the circumference of the interior surface (140). In other embodiments, the second interior shoulder (142) may be discontinuous, may extend around only a portion of the circumference of the interior surface (140), and/or may extend intermittently around the circumference of the interior surface (140). The second interior shoulder (142) faces toward and is configured to engage with the second exterior shoulder (108) on the second member (72).

As depicted in FIGS. 3-5, the second collar (122) comprises a thread (144) on the interior surface (140) of the second collar (122). In other embodiments, the second collar (122) may comprise a thread (144) on an exterior surface (146) of the second collar (122).

The thread (134) on the first collar (120) and the thread (144) on the second collar (122) provide a releasable collar connection (150) between the first collar (120) and the second collar (122).

In order to facilitate the threaded collar connection (150) depicted in FIGS. 2-5, an amount of overlap must be provided between the first collar (120) and the second collar (122). In the embodiments of the connection depicted in FIG. 3 and FIG. 5, the second collar (122) overlaps the first collar (120). As a result, the thread (134) on the first collar (120) is an external thread and the thread (144) on the second collar (122) is an internal thread. In other embodiments utilizing a threaded collar connection (150), the first collar (120) may overlap the second collar (122). In such other embodiments, the thread (134) on the first collar (120) may be an internal thread and the thread (144) on the second collar (122) may be an external thread.

In other embodiments, the collar connection (150) may comprise a releasable connection between the first collar (120) and the second collar (122) other than a threaded connection. In other embodiments, the collar connection (150) may comprise a permanent connection between the first collar (120) and the second collar (122).

The collar connection (150) between the first collar (120) and the second collar (122) comprising the thread (134) and the thread (144), as depicted in FIGS. 3-5, provides a releasable connection between the first collar (120) and the second collar (122) which is capable of transmitting axial forces in both directions between the collars (120, 122).

In other embodiments, the collar connection (150) may be capable of transmitting axial forces in only one direction between the collars (120, 122). In such embodiments, the collar connection (150) is capable of transmitting axial forces between the collars (120, 122) in the direction which will prevent or inhibit separation of the first member (70) and the second member (72). In other words, the collar connection (150) is capable of transmitting at least a tensile force between the first collar (120) and the second collar (122) so that the collars (120, 122) can in turn exert a compressive force upon the members (70, 72) through the engagement between the interior shoulders (132, 142) and the exterior shoulders (88, 108).

The first connection (62) and the second connection (64) transmit both torque and axial forces between the first member and the second member. In this regard, as depicted in FIGS. 2-5, the first connection (62) and the second connection (64) comprise separate structures, device and/or apparatus for providing a torque transmitting connection (152) and an axial force transmitting connection (154) between the first member (70) and the second member (72).

In the non-limiting embodiment depicted in FIGS. 2-5, the torque transmitting connection (152) comprises the polygonal interior surface (86) in the socket (84) of the first member (70) and the polygonal exterior surface (106) on the pin (104) of the second member (72), which provide complementary torque transmitting surfaces.

In the non-limiting embodiment depicted in FIGS. 2-5, the axial force transmitting connection (154) comprises the first exterior shoulder (88) on the exterior surface (82) of the first member (70), the second exterior shoulder (108) on the exterior surface (102) of the second member (72), the first interior shoulder (132) on the interior surface (130) of the first collar (120), the second interior shoulder (142) on the interior surface (140) of the second collar (122), and the collar connection (150) between the first collar (120) and the second collar (122).

Referring to FIGS. 6-8, embodiments of a connection are depicted which may facilitate assembly of the connection in some circumstances. As a non-limiting example, the connections depicted in FIGS. 6-8 may be suitable for use as either the first connection (62) or the second connection (64) in the transmission section depicted in FIG. 2.

Referring to FIG. 2, the configuration of the flex shaft (60) may cause difficulty in assembling the connections (62, 64), because the second exterior shoulders (108) at the ends of the flex shaft (60) may prevent the second collars (122) from passing over the ends of the flex shaft (60).

Referring to FIG. 6, in such circumstances, the second exterior shoulders (108) at one or both ends of the flex shaft (60) and the second interior shoulders (142) on the second collars (122) may comprise discontinuous shoulders (108, 142) around the circumference of the exterior surface (102) of the flex shaft (60) and the interior surface (140) of the second collars (122) respectively.

The discontinuous shoulders (108, 142) may define complementary gaps (160) which enable an alignment between the second collars (122) and the flex shaft (60) which will permit the second collars (122) to move past the second exterior shoulders (108) on the flex shaft (60), and an alignment between the second collars (122) and the flex shaft (60) which will enable the second interior shoulders (142) on the second collars (122) to engage with the second exterior shoulders (108) on the flex shaft (60). As depicted in FIGS. 6-8, complementary gaps (160) are optionally provided in the first exterior shoulders (88) as well as in the second exterior shoulders (108).

Referring to FIG. 7, in a modified embodiment of the connection depicted in FIG. 6, a rotary locking mechanism (162) may be provided to prevent or inhibit a second collar (122) and the flex shaft (60) from moving from the alignment in which the second interior shoulder (142) of the second collar (122) is engaged with a second exterior shoulder (108).

The rotary locking mechanism (162) may comprise any suitable structure, device or apparatus. As depicted in FIG. 7, the rotary locking mechanism (162) comprises one or more notches (164) in one of the second exterior shoulder (108) and the second interior shoulder (142), and one or more complementary tabs (166) in the other of the second exterior shoulder (108) and the second interior shoulder (142).

Referring to FIG. 8, two second collars (122) are depicted on the flex shaft (60), with the assembly of the second collars (122) on the flex shaft (60) being facilitated by discontinuous shoulders (108) on both ends of the flex shaft (60) and discontinuous shoulders (142) on both of the second collars (122) respectively, as depicted in FIG. 6. In other embodiments, a discontinuous shoulder (108) may be provided on only one end of the flex shaft (60), and both of the second collars (122) can be placed on the flex shaft (60) from the end of the flex shaft (60) having the discontinuous shoulder (108).

The transmission section (24) comprising the first connection (62) and the second connection (64) as depicted in FIGS. 2-5 may be assembled as follows:

1. the rotor adapter (74) may be connected with the rotor (42) so that the rotor (42) comprises the rotor adapter (74), or a rotor (42) having the features of the rotor adapter (74) may be provided;
2. the first collar (120) of the first connection (62) may be slidably received on the rotor (42), either by passing the first collar (120) along the length of the rotor (42) toward the first member connection end (80) of the rotor (42), or by preassembling the first collar (120) and the rotor adapter (74) before connecting the rotor adapter (74) with the rotor (42), as may be applicable;
3. the second collar (122) of the first connection (62) may be slidably received on the flex shaft (60) by passing the second collar (122) along the length of the flex shaft (60) toward the rotor (42). If necessary, an embodiment of the connection as depicted in FIGS. 6-8, a second collar (122) comprising a plurality of collar components (not shown), or some other configuration or technique may be used to facilitate assembly of the second collar (122) on the flex shaft (60);
4. the pin (104) on the second member connection end (100) of the flex shaft (60) for the first connection (62) may be inserted within the socket (84) at the first member connection end (80) of the rotor (42);
5. the thread (134) on the first collar (120) and the thread (144) on the second collar (122) of the first connection (62) may be threaded together until the interior shoulders (132, 142) engage with the exterior shoulders (88, 108) at a desired torque, thereby placing the collar connection (150) in tension, in order to provide the threaded collar connection (150) for the first connection (62);
6. the second collar (122) of the second connection (64) may be slidably received on the flex shaft (60) by passing the second collar (122) along the length of the flex shaft (60) toward the driveshaft (44). If necessary, an embodiment of the connection as depicted in FIGS. 6-8, a second collar (122) comprising a plurality of collar components (not shown), or some other configuration or technique may be used to facilitate assembly of the second collar (122) on the flex shaft (60);
7. the driveshaft adapter (76) may be connected with the driveshaft (44) so that the driveshaft (44) comprises the driveshaft adapter (76), or a driveshaft (44) having the features of the driveshaft adapter (76) may be provided;
8. the first collar (120) of the second connection (66) may be slidably received on the driveshaft (44), either by passing the first collar (120) along the length of the driveshaft (44) toward the first member connection end (80) of the driveshaft (44), or by preassembling the first collar (120) and the driveshaft adapter (76) before connecting the driveshaft adapter (76) with the driveshaft (44), as may be applicable;
9. the pin (104) on the second member connection end (100) of the flex shaft (60) for the second connection (64) may be inserted within the socket (84) at the first member connection end (80) of the driveshaft (44); and
10. the thread (134) on the first collar (120) and the thread (144) on the second collar (122) of the second connection (64) may be threaded together until the interior shoulders (132, 142) engage with the exterior shoulders (88, 108) at a desired torque, thereby placing the collar connection (150) in tension, in order to provide the threaded collar connection (150) for the second connection (64).

The transmission section (24) comprising the first connection (62) and the second connection (64) as depicted in FIGS. 2-5 may also be assembled in reverse order, so that the second connection (64) is assembled before the first connection (62).

ADDITIONAL DISCLOSURES

The following are non-limiting, specific embodiments of the connection described herein:

Embodiment A

A connection for connecting a first member with a second member, the connection comprising:
 (a) a torque transmitting connection between the first member and the second member;
 (b) an axial force transmitting connection between the first member and the second member, the axial force transmitting connection comprising:
  (i) a first exterior shoulder on an exterior surface of the first member, wherein the first member has a first member connection end, wherein the first exterior shoulder is transverse to an axis of the first member, and wherein the first exterior shoulder faces away from the first member connection end;
  (ii) a second exterior shoulder on an exterior surface of the second member, wherein the second member has a second member connection end, wherein the second exterior shoulder is transverse to an axis of the second member, and wherein the second exterior shoulder faces away from the second member connection end;
  (iii) a first collar having an interior surface and a first interior shoulder on the interior surface for engaging with the first exterior shoulder;
  (iv) a second collar having an interior surface and a second interior shoulder on the interior surface for engaging with the second exterior shoulder; and
  (v) a collar connection between the first collar and the second collar, for transmitting at least tensile axial forces between the first collar and the second collar.

Embodiment B

The connection of Embodiment A wherein the first member and the second member have complementary torque transmitting surfaces, and wherein the torque transmitting connection comprises the complementary torque transmitting surfaces.

Embodiment C

The connection of Embodiment B wherein one of the first member connection end and the second member connection end comprises a pin, wherein the other of the first member connection end and the second member connection end comprises a socket, wherein the pin is receivable within the socket, and wherein the complementary torque transmitting surfaces are provided on the pin and in the socket.

Embodiment D

The connection of Embodiment C wherein the pin has a polygonal exterior surface, wherein the socket has a polygonal interior surface, and wherein the complementary torque transmitting surfaces comprise the polygonal exterior surface of the pin and the polygonal interior surface of the socket.

Embodiment E

The connection of any one of Embodiments A through D wherein the first member and the second member are components of a powertrain.

Embodiment F

The connection of any one of Embodiments A through E wherein the first member and the second member are components of an apparatus for use in a borehole.

Embodiment G

The connection of any one of Embodiments A through F wherein the first member and the second member are components of a drilling motor for use in drilling a borehole.

Embodiment H

The connection of Embodiments A through G wherein one of the first member and the second member is a transmission shaft.

Embodiment I

The connection of Embodiment H wherein the transmission shaft comprises a flex shaft.

Embodiment J

The connection of any one of Embodiments A through I wherein the collar connection is a releasable connection.

Embodiment K

The connection of any one of Embodiments A through I wherein the collar connection comprises a threaded connection.

Embodiment L

The connection of any one of Embodiments A through K wherein the first exterior shoulder and the first interior shoulder are discontinuous shoulders.

Embodiment M

The connection of Embodiment L wherein the first exterior shoulder and the first interior shoulder define complementary gaps.

Embodiment N

The connection of any one of Embodiments L or M, further comprising a rotary locking mechanism between the first member and the first collar.

Embodiment O

The connection of Embodiment N wherein the rotary locking mechanism comprises a notch in one of the first exterior shoulder and the first interior shoulder and a tab in the other of the first exterior shoulder and the first interior shoulder.

Embodiment P

The connection of any one of Embodiments A through O wherein the second exterior shoulder and the second interior shoulder are discontinuous shoulders.

Embodiment Q

The connection of Embodiment P wherein the second exterior shoulder and the second interior shoulder define complementary gaps.

Embodiment R

The connection of any one of Embodiments P or Q, further comprising a rotary locking mechanism between the second member and the second collar.

Embodiment S

The connection of Embodiment R wherein the rotary locking mechanism comprises a notch in one of the second exterior shoulder and the second interior shoulder and a tab in the other of the second exterior shoulder and the second interior shoulder.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

I claim:

1. A connection for connecting a first member with a second member, the connection comprising:
   (a) a torque transmitting connection between the first member and the second member;
   (b) an axial force transmitting connection between the first member and the second member, the axial force transmitting connection comprising:
      (i) a first exterior shoulder on an exterior surface of the first member, wherein the first member has a first member connection end, wherein the first exterior shoulder is transverse to an axis of the first member, and wherein the first exterior shoulder faces away from the first member connection end;
      (ii) a second exterior shoulder on an exterior surface of the second member, wherein the second member has a second member connection end, wherein the second exterior shoulder is transverse to an axis of the second member, wherein the second exterior shoulder faces away from the second member connection end, and wherein the second exterior shoulder is discontinuous;
      (iii) a first collar having an interior surface and a first interior shoulder on the interior surface for engaging with the first exterior shoulder;
      (iv) a second collar having an interior surface and a second interior shoulder on the interior surface for engaging with the second exterior shoulder, wherein the second interior shoulder is discontinuous, and wherein the second exterior shoulder and the second interior shoulder define complementary gaps which enable an alignment between the second collar and the second member which permits the second collar to move past the second exterior shoulder and an alignment between the second collar and the second member which enables the second interior shoulder to engage with the second exterior shoulder; and
      (v) a collar connection between the first collar and the second collar, for transmitting at least tensile axial forces between the first collar and the second collar.

2. The connection as claimed in claim 1 wherein the first member and the second member have complementary torque transmitting surfaces, and wherein the torque transmitting connection comprises the complementary torque transmitting surfaces.

3. The connection as claimed in claim 2 wherein one of the first member connection end and the second member connection end comprises a pin, wherein the other of the first member connection end and the second member connection end comprises a socket, wherein the pin is receivable within the socket, and wherein the complementary torque transmitting surfaces are provided on the pin and in the socket.

4. The connection as claimed in claim 3 wherein the pin has a polygonal exterior surface, wherein the socket has a polygonal interior surface, and wherein the complementary torque transmitting surfaces comprise the polygonal exterior surface of the pin and the polygonal interior surface of the socket.

5. The connection as claimed in claim 3 wherein the collar connection is a releasable connection.

6. The connection as claimed in claim 5 wherein the pin has a polygonal exterior surface, wherein the socket has a polygonal interior surface, and wherein the complementary torque transmitting surfaces comprise the polygonal exterior surface of the pin and the polygonal interior surface of the socket.

7. The connection as claimed in claim 6 wherein the collar connection comprises a threaded connection.

8. The connection as claimed in claim 7 wherein the first member and the second member are components of a powertrain.

9. The connection as claimed in claim 7 wherein the first member and the second member are components of an apparatus for use in a borehole.

10. The connection as claimed in claim 7 wherein the first member and the second member are components of a drilling motor for use in drilling a borehole.

11. The connection as claimed in claim 10 wherein one of the first member and the second member is a transmission shaft in the drilling motor.

12. The connection as claimed in claim 11 wherein the transmission shaft comprises a flex shaft.

13. The connection as claimed in claim 1 wherein the collar connection is a releasable connection.

14. The connection as claimed in claim 1 wherein the collar connection comprises a threaded connection.

15. The connection as claimed in claim 1 wherein the first member and the second member are components of a powertrain.

16. The connection as claimed in claim 1 wherein the first member and the second member are components of an apparatus for use in a borehole.

17. The connection as claimed in claim 1 wherein the first member and the second member are components of a drilling motor for use in drilling a borehole.

18. The connection as claimed in claim 17 wherein one of the first member and the second member is a transmission shaft in the drilling motor.

19. The connection as claimed in claim 18 wherein the transmission shaft comprises a flex shaft.

20. The connection as claimed in claim 1, further comprising a rotary locking mechanism for inhibiting the second collar and the second member from moving from the alignment which enables the second interior shoulder to engage with the second exterior shoulder, wherein the rotary locking mechanism comprises one or more notches in one of the second exterior shoulder and the second interior shoulder and one or more complementary tabs in the other of the second exterior shoulder and the second interior shoulder.

* * * * *